United States Patent [19]
Breslow

[11] 3,767,197
[45] Oct. 23, 1973

[54] GAME USING ANSWER CUBES AND RECEPTACLE THEREFOR

[75] Inventor: Jeffrey D. Breslow, Chicago, Ill.

[73] Assignee: Marvin Glass & Associates, Chicago, Ill.

[22] Filed: Oct. 18, 1971

[21] Appl. No.: 190,054

[52] U.S. Cl........ 273/1 R, 273/102.1 R, 273/102.4, 273/105 R
[51] Int. Cl. ............................................. A63f 9/00
[58] Field of Search .......................... 273/1 R, 86 C; 35/32, 31 G, 8 R

[56] References Cited
UNITED STATES PATENTS
| | | | |
|---|---|---|---|
| 3,502,332 | 3/1970 | Wolf | 273/86 C |
| 3,154,863 | 11/1964 | La Prelle | 35/31 G X |
| 3,304,627 | 2/1967 | Cella | 35/8 R |
| 3,339,921 | 9/1967 | Glass et al. | 273/1 R |

Primary Examiner—Anton O. Oechsle
Assistant Examiner—Paul E. Shapiro
Attorney—James F. Coffee

[57] ABSTRACT

A question and answer type game which includes, in combination, a plurality of card-like members each bearing question-type indicia, a plurality of cube-shaped answer designation members each having different answer indicia associated with the question indicia on one or more of the cards, and a chute device for receiving the answer designation cubes and maintaining the cubes in the chronological order of their being deposited in the chute by the players of the game. The chute has a funnel portion for receiving the answer designation cubes and a base portion on which the funnel portion is readily removably mounted. The funnel portion has a window on one side thereof to permit visual observation of the answer designation cubes therein. The base portion has means to block the window when the funnel portion is mounted thereon to thereby selectively prevent visual observation of the answer cubes. The funnel portion thus must be removed from the base portion in order to see the answer designation cubes contained therein as well as the chronological order of their having been deposited therein. In the preferred embodiment of the invention, a plurality or set of answer designation cubes are provided for each player of the game so that the players must select the particular cube which will answer questions or solve the problem presented by one or more of the question cards.

6 Claims, 5 Drawing Figures

Patented Oct. 23, 1973
3,767,197
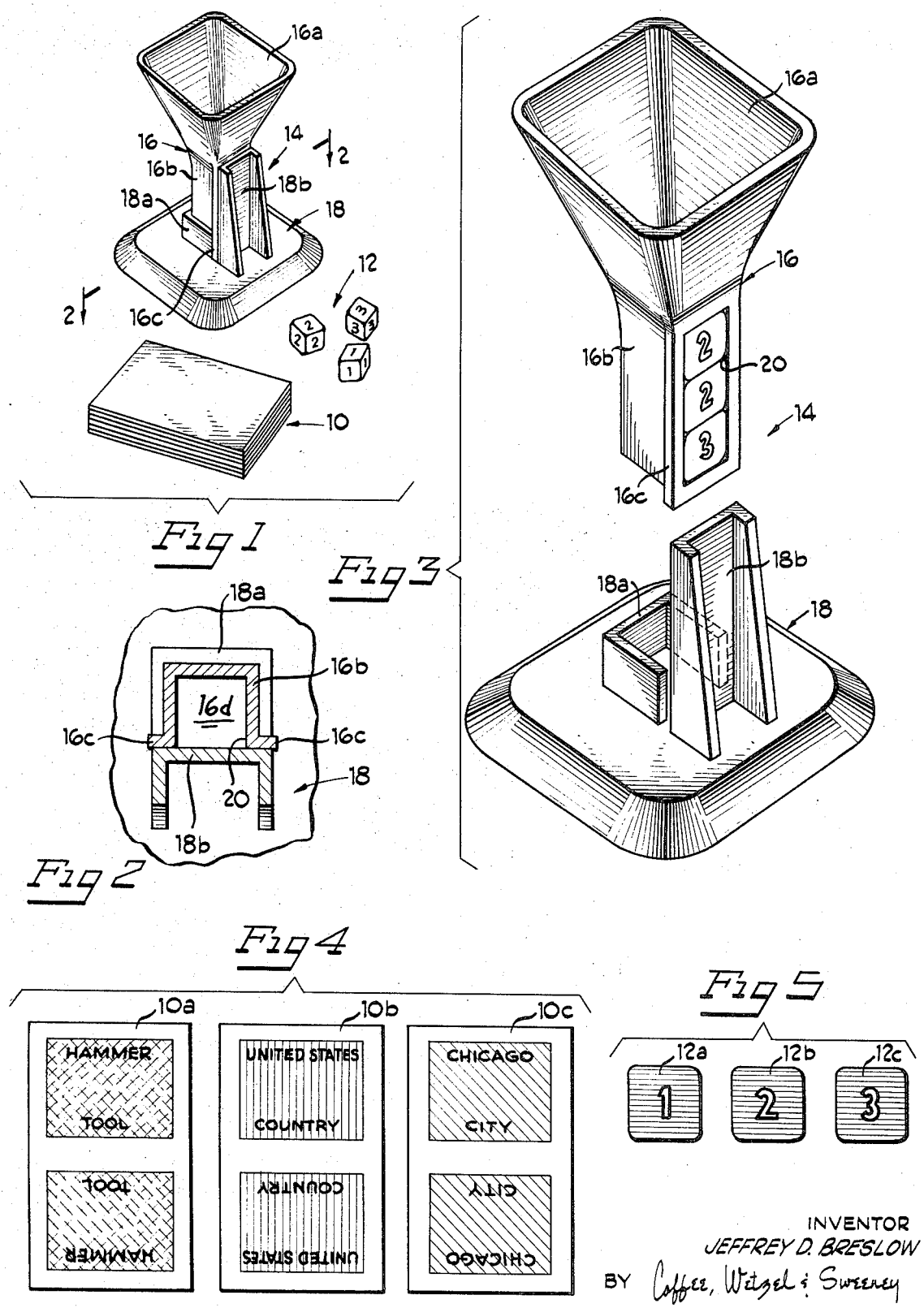
INVENTOR
JEFFREY D. BRESLOW
BY Coffee, Witzel & Sweeney
ATTORNEYS

GAME USING ANSWER CUBES AND RECEPTACLE THEREFOR

BACKGROUND AND SUMMARY OF THE INVENTION

This invention relates to games for use both by children and adults and, more particularly, to a question and answer type game.

Question and answer type games have been known for some time and have various schemes designed to provide a challenge to as well as create competition for the players of the game. In some games ingenuity is required of the questioning player or players of the game as well as the answering player or players. Such games are designed primarily to develop the creativity or ingenuity of the players, particularly children, as well as stimulate the learning propensities of the child. The present invention is designed to provide a new and improved question and answer type game which not only is designed to enhance the creativity and learning processes of the child but included in the design of the game is a requirement of manual dexterity which tends to develop the reflexes of the players of the game.

The principal object, therefore, of the present invention is to provide a new and improved game device, and, more particularly, a new and improved question and answer type game.

In the embodiment of the invention disclosed herein, the answer designation members are cube-shaped, similar to dice, and each respective answer cube has the same answer designation or indicia on all six sides thereof so that the answer designation or indicia can be seen by looking only at one side of the answer cube. A plurality or set of the answer designation cubes is provided for each player of the game with different answer designations or indicia on each of the answer cubes in the set. In the scheme of the game shown herein, the answer designation or indicia on the sides of the answer cubes is numerical in nature.

Means is provided in the form of a depository chute for receiving the answer designation cubes and maintaining the cubes in the chronological order of their being deposited in the chute by the answering players of the game. More particularly, the chute includes a funnel portion for receiving the answer designation cubes and a base portion on which the funnel portion is readily removably mounted. The funnel portion has an enlarged open mouth into which the answer designation cubes are deposited and a lower square hollow column which has slightly larger cross-sectional interior dimensions than the size of the answer cubes. The lower hollow column has a window on one side thereof to permit visual observation of the answer designation cubes in the column. The base portion has means in the form of a wall to block the window when the funnel portion is mounted on the base portion thereby to permit visual observation of the answer designation cubes within the funnel portion only when the funnel portion is raised off of the base portion.

A plurality of card-like members are provided each bearing question type indicia for utilization with the answer designation cubes. Obviously, various schemes for playing the game may be devised and will be described with greater detail hereinafter in the detailed description of the invention. As pointed out hereinafter, the question cards and/or answer cubes may be color coded to provide for further variations in schemes for playing the game.

Other objects, features and advantages of the invention will be apparent from the following detailed description taken in connection with the accompanying drawings.

DESCRIPTION OF THE DRAWINGS

FIG. 1 is a perspective view of the combination comprising the question and answer type game of the present invention;

FIG. 2 is a horizontal section through the depository chute means of the present invention taken generally along the line 2—2 of FIG. 1;

FIG. 3 is a perspective view of the depository chute means, with the funnel portion thereof raised from the base portion thereof to permit visual observation of the answer designation cubes within the funnel portion;

FIG. 4 is a plan view of three question cards of the type used in the disclosed scheme for playing the game of the present invention; and FIG. 5 is a plan view of three answer cubes of the type used in the combination of the present invention.

DETAILED DESCRIPTION OF THE INVENTION

Referring to the drawings in greater detail, and first to FIG. 1, the combination of the present invention comprises a plurality of card-like question designation members, generally designated 10 in FIG. 1 and 10a–10c in FIG. 4; a plurality of cube-shaped answer designation members, generally designated 12 in FIG. 1 and 12a–12c in FIG. 5; and means in the form of a depository chute, generally designated 14, defining means for receiving the cubes 12 and maintaining the cubes in the chronological order of their being deposited in the chute 14 by the players of the game. Hereinafter the members 10 (10a–10c) will be referred to as "question cards" and the members 12 (12a–12c) will be referred to as "answer cubes."

The answer cubes 12 generally are in the form of dice and a plurality or set thereof is provided for each player of the game. Each answer cube in each set has different answer indicia thereon, but all faces of an individual answer cube has the same answer indicia so that the indicia may be observed by looking at only one side of a cube. Preferably, the answer cubes of each set have the same color in order to readily indicate which cube was deposited in the chute 14 by which player of the game.

The depository chute 14 (FIGS. 1 and 3) includes a funnel portion, generally designated 16, and a base portion, generally designated 18. The funnel portion 16 is removably mounted on the base portion 18 and has an upper, enlarged open mouth portion 16a the sides of which slope inwardly to a lower, hollow, square cross-sectional shaped column portion 16b. The lower column portion 16b has a window 20 on one side thereof so that the answer cubes received therein may be visually observed, as seen in FIG. 3. The interior cross-sectional dimensions of the hollow column 16b are slightly larger than the answer cubes 12 so that the answer cubes will come to rest within the column portion 16b, on a bottom wall 16d, in the chronological order of their being deposited into the open mouth 16a by the players of the game. The lower end of the column portion 16b of the funnel portion 16 is mounted on the the base portion 18 within an upstanding U-shaped flange 18a. Adjacent the U-shaped flange 18a is an upstanding blocking flange 18b which blocks the window 20 in the funnel portion 16 when the funnel portion is mounted on the base portion 18. The funnel portion 16 has a pair of outwardly extending ribs 16c, as best seen in FIG. 2, which extend outwardly between the ends of the legs of the U-shaped flange 18a and the upstanding blocking flange 18b to insure that the funnel portion 16 of the depository chute 14 will be mounted on the base portion 18 with the window 20 blocked by the blocking flange 18b.

In the preferred embodiment of the invention, a plurality of question cards 10 are provided, examples of which are shown in FIG. 4 as 10a–10c. Various schemes may be devised for use with the answer cubes 12 and the depository chute 14 to complement the structure which receives the answer cubes and maintains the answer cubes in the chronological order of their being deposited in the chute by the players of the game.

One scheme for playing the game is as follows: One set of answer cubes (e.g., 12a–12c in the drawings) is provided for each player of the game. The answer cubes in each set have numerical indicia such as the numbers 1, 2 and 3 as shown in the drawings. As pointed out above, the answer cubes in each set should have the same color to readily indicate which cube was deposited in the chute 14 by which player. A plurality of cards 10 (for instance 100 cards) are provided, with certain of the cards in different subject matter categories. For instance, there may be 10 different categories and 10 different cards for each category. In the embodiment of the invention shown in the drawings, the indicia on the cards is in the form of different words. An example of 10 different categories might be: warm-blooded animal, cold-blooded animal, fruit, country, vehicle, tool, furniture, city, vegetable and state. Each card may be labelled with a word, a color (for each category), and the name of one of the 10 categories. Three such cards, 12a–12c, can be seen in FIG. 4.

Utilizing the above card scheme, the game could be played such that one of the players would read the cards and the other remaining players each would throw out of the answer cubes 12 into the open mouth of the depository chute 14. Each player takes a turn reading his own combination of cards in order to stump the other players with tricky combinations. One play of the game might be that the reading player reads three cards, with two of the cards in the same category and one of the cards in an odd category. The answer cube throwers ready themselves in order to be the first player to throw a numbered answer cube (e.g., the number indicating which of the three cards, in the order of their being read, did not belong in the same category with the other two) into the open mouth 16a of the funnel portion 16 of the depository chute 14.

Once the reading player has finished reading his cards, each player tosses his choice of the numbered answer cubes into the funnel 16. For example, the reading player might read off the words wrench, hammer and sled. The number 3 answer cube (odd category) should be tossed quickly by the answering players into the funnel portion 16. The funnel portion 16 is pulled up and off of the base portion 18 to reveal the winning numbers and players. Visual observation through the window 20 of the removed funnel will show the first, second and third answer cubes in the order from bottom to top, i.e., the chronological order of depositing the cubes into the funnel.

With the above scheme, numerous methods of scoring or determining the ultimate winner of the game may be devised. For instance, the first place (or bottom) cube throwing player could be awarded two cards from the deck of 100 cards. The second place cube throwing player would be awarded one card from the deck. The third place cube throwing player would receive no cards from the deck unless one or both of the other cube players was wrong. When a card reading player stumps a cube throwing player, the cube throwing player must give the card reading player a card from his hand or deck. The card reading player may bluff the cube throwing players by reading a series of cards which provide no answer (e.g. with the above scheme, all cards in the same category). A cube throwing player does not have to throw a cube if he is unsure of the answer. When the card reading player does not stump any cube throwing player, he must pay one card to each player. When a card reading player stumps one or more players, only the stumped players pay the card reading player a card. The game might be considered terminated when the deck of cards is depleted, with the player having the highest number of cards declared the winner.

Of course, the above scheme of playing the question and answer type game of the present invention is but one of numerous possible schemes or methods. For instance, a very simple game could be played by simply reading off multiple answer questions wherein the answer cubes 12 would be thrown into the funnel 16 to indicate the answering player's choice of one of the given multiple answers. It also should be understood that the terms "question and answer type game" are used herein merely as preferred terminology, for it is readily apparent that various game schemes could be devised with the present invention which would require mere recognition of objects or information rather than answering a question, solving a riddle or puzzle, or the like.

It is obvious that upon study by those skilled in the art the disclosed invention may be altered or modified without departing from its inventive concept.

I claim:

1. For use in a question and answer type game, or the like, the combination comprising a plurality of generally cube shaped answer designation members at least one for each player of the game, and means defining a chute the interior of at least a portion of which is generally square in cross section for receiving such answer designation members, said chute being slightly larger in cross section than the square dimensions of said cube shaped answer designation members for maintaining the members in the chronological order of their being deposited in the chute by the players of the game.

2. For use in a question and answer type game, or the like, the combination comprising a plurality of answer designation members at least one for each player of the game, and means defining a chute for receiving said answer designation members and maintaining the members in the chronological order of their being deposited in the chute by the players of the game, said chute including a funnel portion for receiving said answer designation members and a base portion on which the funnel portion is removably mounted, said funnel portion having a window for permitting visual observation of the answer designation members so that the players may determine the order of depositing the members in the chute without removing the members from the chute, and said base portion having means to block said window when the funnel portion is mounted on the base portion for selectively preventing visual observation of the answer designation members when received in the chute while the chute is mounted on the base portion whereby the game may be played so as to require each player to deposit his answer designation member in the chute before permitting visual observation of the other deposited members.

3. For use in a question and answer type game, or the like, the combination comprising a plurality of cube shaped answer designation members each having different answer indicia thereon so as to comprise a set thereof, one set for each player of the game, the sets having different colors so as to distinguish the answer designation members of one set from any other set thereof, and means defining a chute the interior of at least a portion of which is generally square in cross section for receiving said answer designation members, the chute being of a size slightly larger than the square dimensions of said cube shaped answer designation members for maintaining the members in the chronological order of their being deposited in the chute by the players of the game, all faces of each of said cube shaped members having the same answer thereon, and including a window on at least one side of said chute to permit visual observation of at least one face of each answer designation cube when received in the chute.

4. The combination of claim 3 including a plurality of card-like members each bearing question-type indicia, the answer indicia on said answer designation members being associated with the question indicia on one or more of said cards.

5. For use in a question and answer type game, or the like, the combination comprising a plurality of answer designation members at least one for each player of the game, and means defining a chute for receiving said answer designation members and maintaining the members in the chronological order of their being deposited in the chute by the players of the game, said chute including a funnel portion for receiving said answer designation members and a base portion on which the funnel portion is removably mounted with the funnel portion generally vertically oriented so that the answer designation members may be deposited by players of the game into the top thereof, said funnel portion and said base portion having cooperating means permitting selective visual observation of the answer designation members within the funnel portion so that the players may determine the order of depositing the members in the funnel portion without removing the members from the funnel portion but only when the funnel portion is removed from said base portion, whereby visual observation of the answer designation members is prevented while the funnel portion is mounted on the base portion so that the game may be played by requiring each player to deposit his answer designation member in the funnel portion before permitting visual observation of the other deposited members.

6. For use in a question and answer type game, or the like, the combination comprising a plurality of three dimensional answer designation members each having different answer indicia thereon so as to comprise a set thereof, one set for each player of the game, and means defining a funnel-shaped chute means for receiving said answer designation members as deposited therein by players of the game, the funnel-shaped chute means having an elongated enclosure portion slightly larger in cross section than the cross sectional dimensions of said three dimensional answer designation members for aligning and maintaining the members in the chronological order of their being deposited in the chute means by the players of the game regardless of the orientation of the chute means, with said sets of answer designation members having different colors so as to indicate which answer designation member was deposited in the chute means by which player of the game.

* * * * *